(12) United States Patent
Lobo et al.

(10) Patent No.: US 6,303,060 B1
(45) Date of Patent: Oct. 16, 2001

(54) METHOD OF MAKING NON-DEFLATABLE TIRE AND WHEEL ASSEMBLY

(75) Inventors: Pedro J. Lobo, Escondido; Roy C. Beer, N. Rialto; James Michael Thomas, Alta Loma; John T. Mizulo, Irvine; James Patrick Sullivan, Newport Beach, all of CA (US)

(73) Assignee: Pacific Circle Technologies, Inc., North Bethesda, MD (US)

( * ) Notice: Subject to any disclaimer, the term of this patent is extended or adjusted under 35 U.S.C. 154(b) by 0 days.

(21) Appl. No.: 08/954,281

(22) Filed: Oct. 20, 1997

(51) Int. Cl.$^7$ .................................................. B60C 7/14
(52) U.S. Cl. ..................... 264/45.7; 264/46.4; 264/261; 152/246; 152/248; 152/249; 156/113
(58) Field of Search .................... 152/246, 247, 152/248, 249, 310, 311, 323; 264/261, 262, 45.1, 45.7, 46.4, 46.9, 46.5; 156/113

(56) References Cited

U.S. PATENT DOCUMENTS

| | | |
|---|---|---|
| 362,472 | 5/1887 | Warwick . |
| 727,582 | 5/1903 | Brintnell . |
| 1,438,604 | 12/1922 | McClure . |
| 2,338,294 * | 1/1944 | Maule ................................... 152/248 |
| 2,673,470 * | 3/1954 | Cosmos ................................. 152/323 |
| 3,445,958 | 5/1969 | Johnson et al. . |
| 3,646,983 | 3/1972 | Lieshoud . |
| 3,952,786 | 4/1976 | Kreling et al. . |
| 4,275,782 * | 6/1981 | McFarlane ........................... 152/310 |
| 4,310,042 | 1/1982 | Wyman et al. . |
| 4,379,104 | 4/1983 | Koorevaar . |
| 4,493,355 | 1/1985 | Ippen et al. . |
| 4,514,243 | 4/1985 | Moore et al. . |
| 4,877,071 * | 10/1989 | Tanigawa et al. ................... 152/322 |
| 5,503,466 * | 4/1996 | Lew ...................................... 152/323 |
| 5,551,763 * | 9/1996 | Alsman ................................ 152/323 |

FOREIGN PATENT DOCUMENTS

| | | |
|---|---|---|
| 27 55 111 | 6/1979 | (DE) . |
| 352-045-A * | 1/1990 | (EP) ...................................... 264/261 |
| 11 005402 | 1/1999 | (JP) . |
| 97/28013 | 8/1997 | (WO) . |

* cited by examiner

*Primary Examiner*—Jeff H. Aftergut
*Assistant Examiner*—Barbara J. Musser
(74) *Attorney, Agent, or Firm*—Ladas & Parry

(57) ABSTRACT

In a preferred embodiment, the invention is a non-deflatable tire assembly having a hollow toroid-shaped flanged insert, a flexible body molded around the insert to form a tire, and at least one rim onto which is mounted the tire. The flange of the insert extends toward the central axis of the insert, and is used to attach the tire to the rim(s) via bolts through matching holes within the flange and rim(s). The flexible body may be made of a foam polyurethane matrix formed of a combination of polyol and polyisocyanate, while the flanged insert may be made of a high density polyethylene. A tough, flexible, and abrasive-resistant layer of polyurethane elastomer is preferably formed around the flexible body to define sidewalls and treads of the tire. To aid in the construction of the assembly and/or to better transmit torque and braking loads from an axle (to which the tire assembly is mounted) to the tire, mating protuberances and holes may be formed in the flange and the rim(s), the rims may be mounted to the tire with an interference fit, and/or the surface of the insert facing the flexible body molded around the insert may be ribbed. Optionally, and for light load conditions, the flange of the insert may extend to and be secured to the axle itself, omitting the need for rims in the tire assembly.

16 Claims, 17 Drawing Sheets

METHOD OF MAKING NON-DEFLATABLE TIRE AND WHEEL ASSEMBLY

FIELD OF THE INVENTION

This invention relates to the field of tires and wheel assemblies, and, more particularly, to non-deflatable tires and wheel assemblies for vehicles and equipment.

BACKGROUND

A familiar and aggravating problem with many conventional tires occurs when tires go flat. A common tire design utilizes air pressure to pressurize the tire or a tube within the tire. Though this design provides substantial ride cushioning and can carry a wide range of loads, a significant drawback is the risk of the tire going flat from air leakage, puncture of the tire or tube, or any other cause resulting in the escape of pressurized air within the tire or tube.

In an effort to address this problem, alternative tire designs have been developed which do not use pressurized air. To obtain ride cushioning and adequate load carrying capacity, these other designs rely upon the structure of the tire and/or rim upon which the tire is mounted and the features of the materials forming such structure.

A solid tire effectively eliminates the risk of a flat. However, a solid tire is unacceptably heavy and requires a substantially greater amount of material to make than a hollow tire, and is thus unacceptably expensive and often does not provide a cushioned ride. Therefore, a number of designs for nondeflatable tires employ a hollow structure which attempts to achieve high load-carrying capacities while still providing a cushioned ride. Examples of such tire designs are disclosed in U.S. Pat. No. 5,551,763 to Alsman, U.S. Pat. No. 1,438,604 to McClure, and U.S. Pat. No. 4,493,355 to Ippen et al.

Another problem often arising in conventional tire designs is the difficulty inherent in mounting the tire on a rim. It is obviously desirable for a tire to be securely mounted on a rim for safe operation of the tire. However, the very design employed to secure the tire on the rim often creates substantial difficulty in the assembly and disassembly of the tire and rim. Conventional non-deflatable tires (such as those described in the U.S. patents mentioned above) do not offer a design where the tire may be easily mounted on or removed from a rim.

Therefore, a need exists for a non-deflatable tire which can carry substantial loads while still providing a cushioned ride, which can be easily mounted and demounted from a rim, and which uses as little material as possible to minimize the weight of the tire and to save on the material costs. The invention as described herein provides such a tire.

SUMMARY OF THE INVENTION

The invention is a non-deflatable tire and method for making such a tire. In a preferred embodiment, the invention includes a toroid-shaped hollow insert surrounded by a flexible body of material forming a tire core or body and a tough outer skin forming a tread and sidewall surfaces. The hollow insert provides load carrying stiffness to the tire, and may be flexible enough to deform under loading and impact, thereby contributing to a cushioned ride. The composition and density of the flexible body of material surrounding the hollow insert also determines the flexibility of the tire and ride cushioning. The hollow insert has a flange which extends into the center of the toroid (toward what would be the central axis of the toroid). This flange may have holes formed therein for attachment of one or more rims to the flange via bolts. The flange may have protuberances formed therein to match protuberances or holes in the rim(s) on which the tire is mounted. Alternatively, the flange may have holes formed therein to match protuberances in the rim(s) on which the tire is mounted.

Torque and braking loads are transmitted from the axle on which the tire is mounted to the bolts in the rim(s) and flange of the insert, and then to the flexible body and treads of the tire. Where protuberances are employed in the flange and rim(s), these protuberances not only help in aligning the tire to the rim(s) during assembly, but also help to transmit torque and braking loads from the rim to the flange of the insert. The fit between the rim(s) and the tire is preferably an interference fit, enabling torque and braking loads to also be transmitted directly from the rim(s) to the tire (e.g., directly to the flexible body). To insure that the insert does not slip with respect to the flexible body surrounding the insert under torque and braking loads, the surface of the insert facing the flexible body may be treated to provide a bond between the flexible body and the insert, and may be ribbed for better engagement of the flexible body to the insert.

In a preferred embodiment, the flexible body is made of polyurethane, and more particularly, a polyurethane foam matrix formed of a combination of polyol and polyisocyanate. Also in a preferred embodiment, the outer tread and sidewalls of the tire are made of a tough, flexible polyurethane elastomer formed of a combination of polyol and polyisocyanate. Also in a preferred embodiment, the insert is made of high density polyethylene. The exact dimensions and cross-sectional shape of the insert and flexible body may affect the cushioning and flexibility properties of the tire, and may therefore be selected according to the intended uses of the tire.

BRIEF DESCRIPTION OF THE DRAWINGS

FIG. 11a is a cross-sectional view of the wheel assembly shown in FIG. 10a, taken along section lines 11—11 of FIG. 10a.

FIG. 11b is another embodiment of the wheel assembly shown in FIG. 11a.

FIG. 11c is another embodiment of the wheel assembly shown in FIG. 11a.

DETAILED DESCRIPTION

Figure 1:
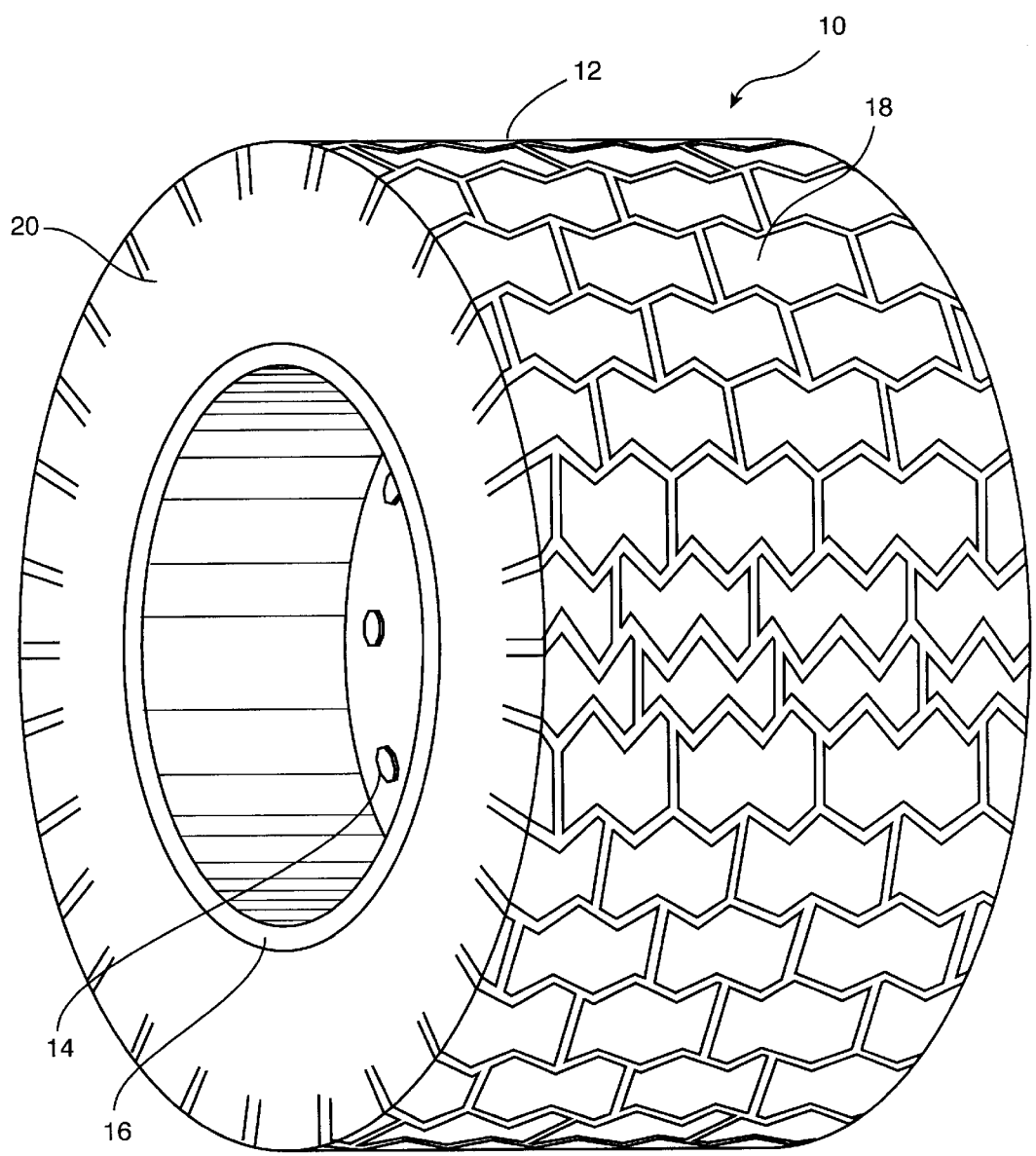
FIG. 1 is a perspective view of the present invention.

The preferred embodiments of the invention are illustrated in FIGS. 1–14. Identical parts are designated by the same reference numerals throughout the drawings. FIG. 1 shows a perspective view of wheel assembly 10, which includes tire 12 mounted by bolts 14 on rims 16 (only one of which can be seen in FIG. 1). Tire 12 has treads 18 and sidewalls 20. Treads 18 are shown in FIG. 1 with a particular zig-zag tread pattern, but can take the form of any number of patterns suitable for the intended uses of the tire and for particular surfaces upon which the tire will be used. Similarly, the particular dimensions (e.g., diameter, tread width, etc.) of tire 12 may vary depending on the intended uses of the tire and the particular surfaces upon which the tire will be used.

Figure 2:
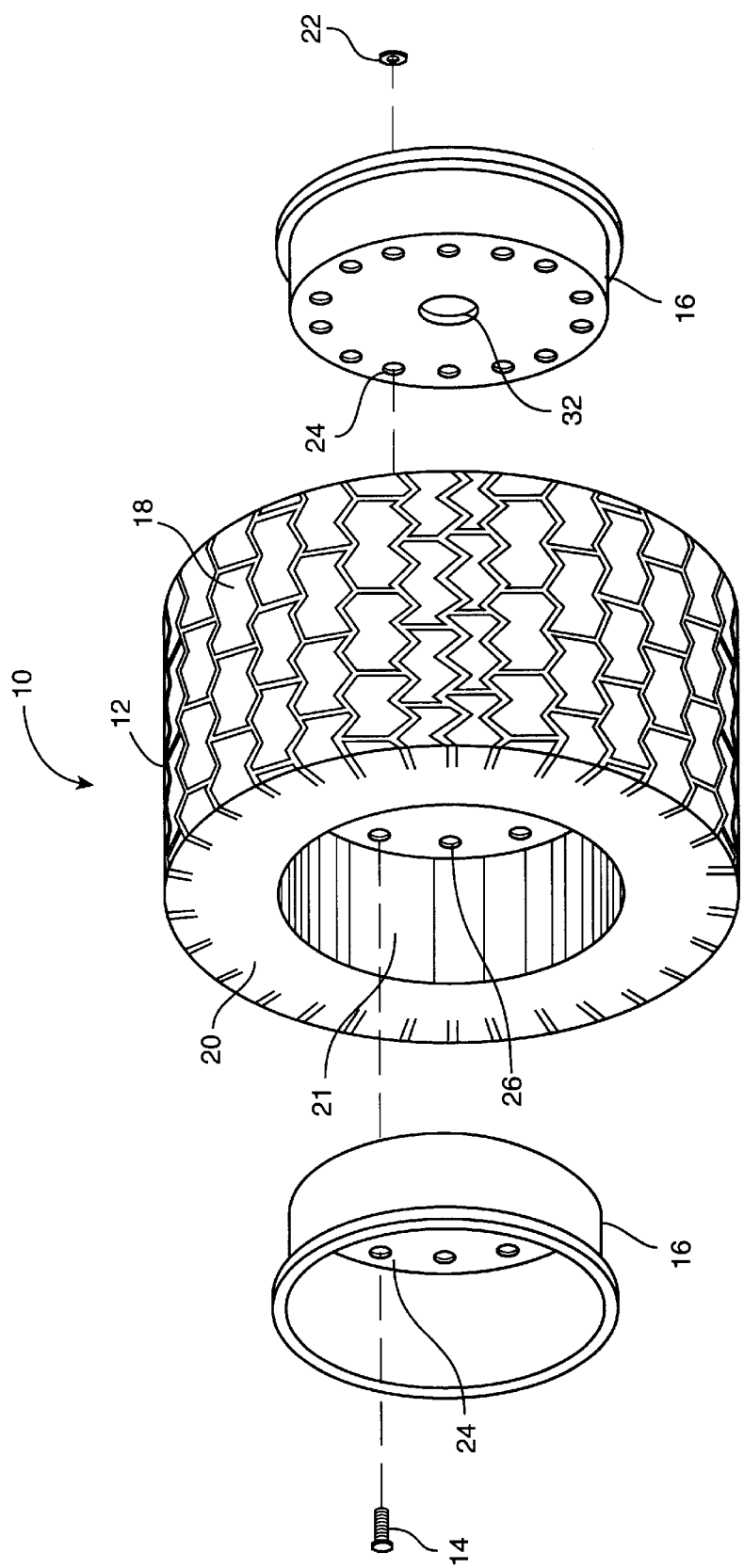
FIG. 2 is an exploded perspective view of the tire and rims shown in FIG. 1.

FIG. 2 is an exploded perspective view of wheel assembly 10. In the embodiment shown in FIG. 2, rims 16 take the form of cups. However, rims 16 may take any number of shapes as are well-known in the art. Rims 16 are inserted within opposing recesses 21 of tire 12, and are then bolted together with bolts 14 and nuts 22 (only one of each being shown by example in FIG. 2) through rim holes 24. The relationship between bolts 14 and flange holes 26 will be described in detail below.

Figure 3:
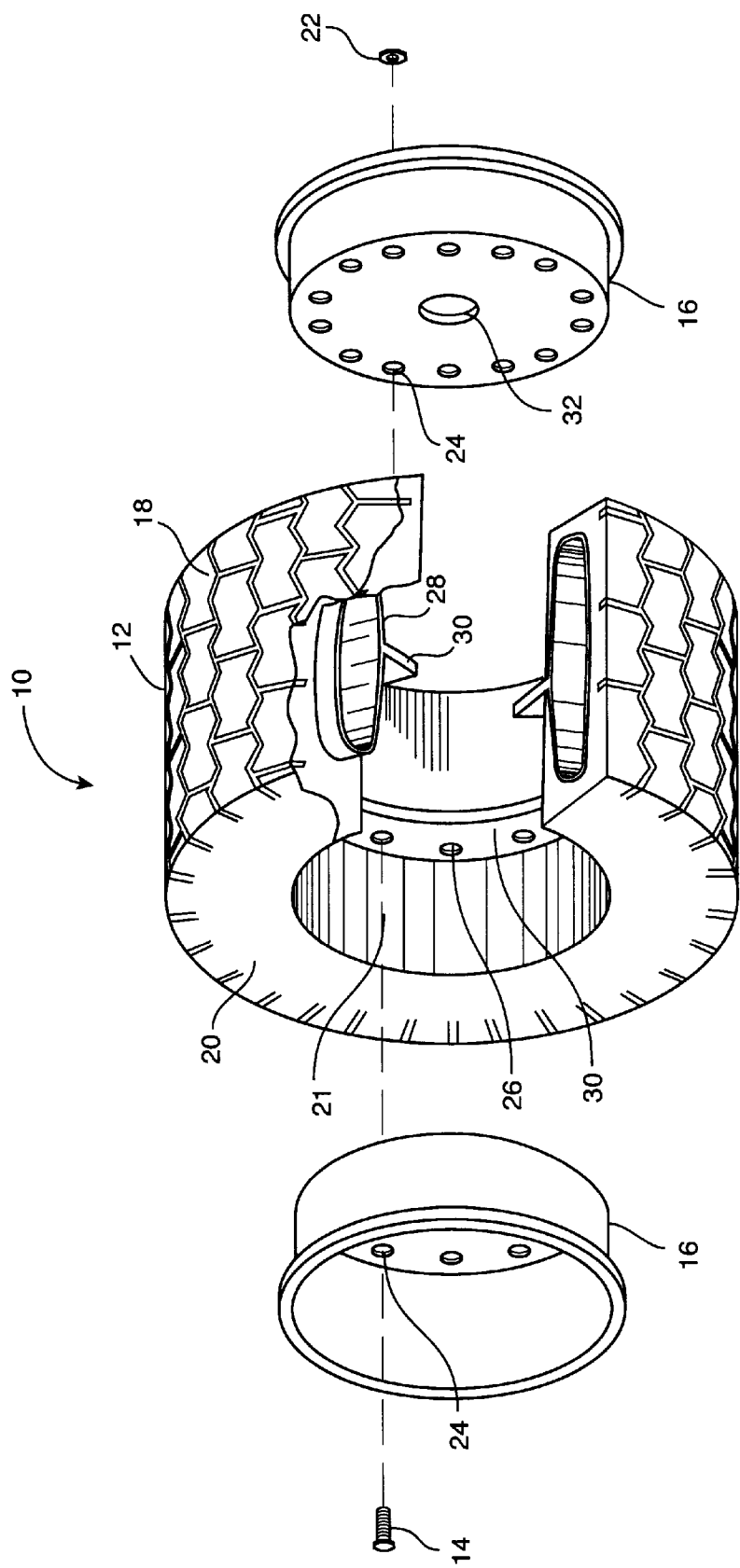
FIG. 3 is the exploded perspective view of FIG. 2, but with the tire being sectioned to show the tire interior.

FIG. 3 is an exploded perspective view of wheel assembly 10, with a section of tire 12 removed to show the interior of tire 12. The removed section of tire 12 reveals a hollow insert 28 within tire 12. Insert 28 is in the form of a hollow toroid which is embedded in tire 12. Insert 28 has flange 30 which is integral with insert 28 and extends toward the center of tire 12. Flange 30 has flange holes 26 which correspond to rim holes 24 in rims 16. With rim holes 24 and flange holes 26 aligned during the mounting of tire 12 on rims 16, each bolt 14 passes though a rim hole 24 in one of rims 16, through a corresponding flange hole 26 in flange 30 of insert 28, and through another corresponding rim hole 24 in the second rim 16. In this manner, rims 16 are bolted to each other and to tire 12 via flange 30. Once assembled, wheel assembly 10 can be mounted on an axle (not shown) in a conventional manner through axle hole 32.

As an alternative to using bolts 14 and nuts 22 to secure rims 16 together through flange holes 26, fastening methods commonly known in the art may be employed, such as self-tapping screws to attach rims 16 together or spot welding rims 16 together. The number of bolts, screws, or spot welds required will vary, and depends largely upon the service conditions of tire 12. In a preferred embodiment, five evenly-spaced rim holes (with corresponding holes in flange 30) are formed in each rim.

Figure 4:
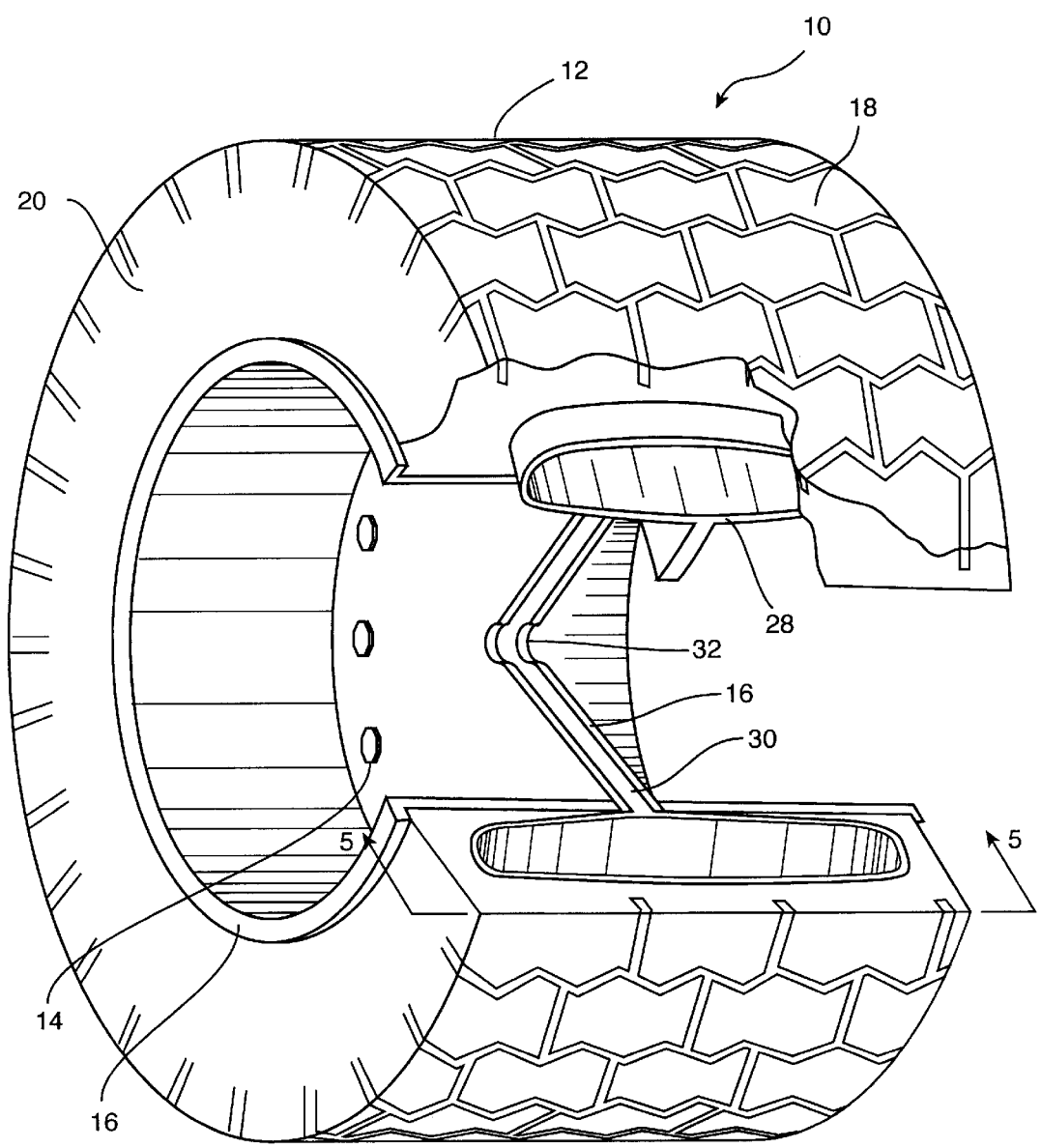
FIG. 4 is a sectioned perspective view of the tire and wheel assembly of the present invention.

FIG. 4 shows a sectioned view of tire 12 mounted on rims 16 as described above. As can be seen, upon assembly, flange 30 of insert 28 is sandwiched between rims 16.

Figure 5:
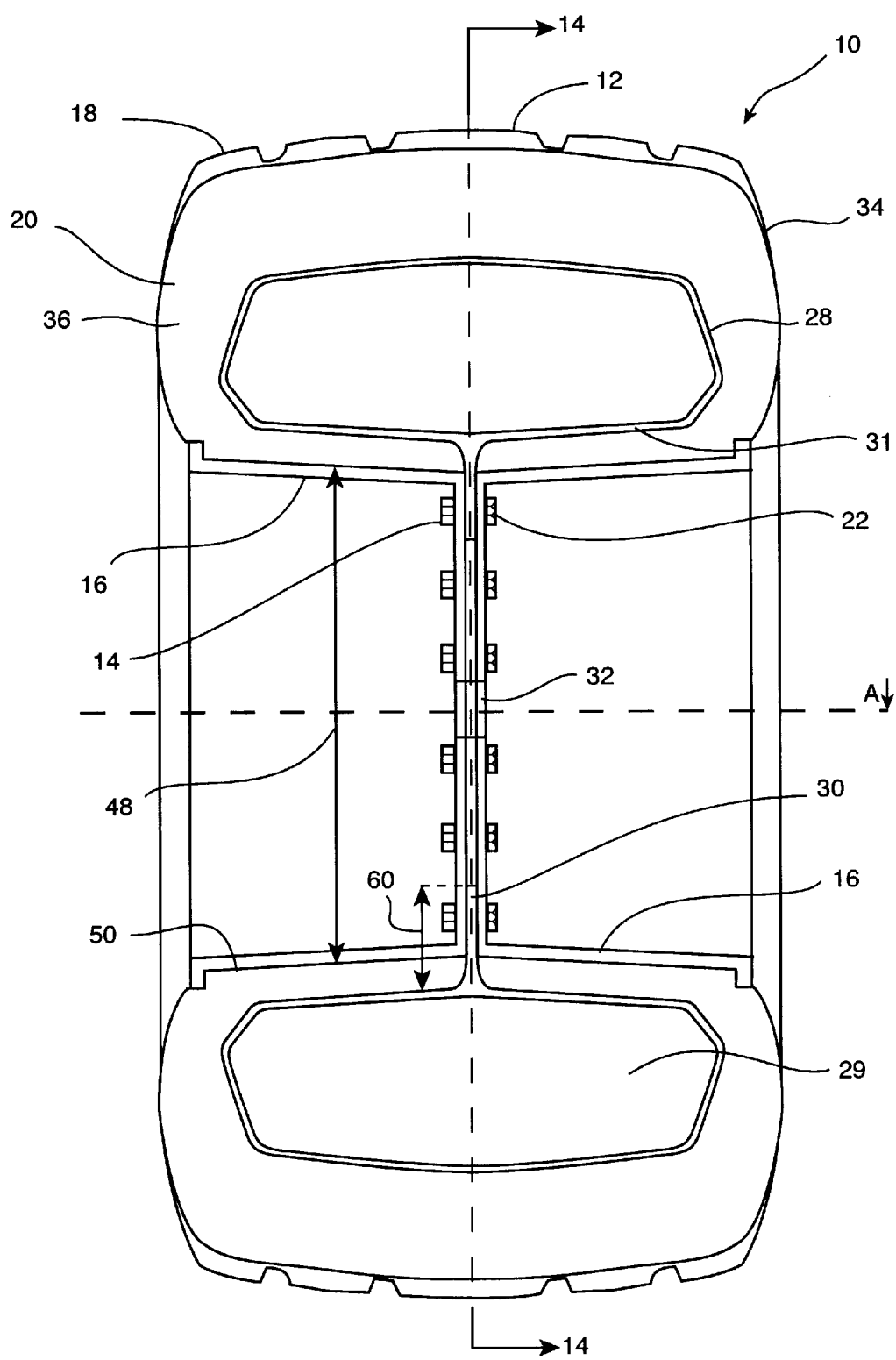
FIG. 5 is a cross-sectional view of the wheel assembly shown in FIG. 4, taken along section lines 5—5 of FIG. 4.

FIG. 5 shows a cross section of the tire shown in FIG. 4, taken along lines 5—5 in FIG. 4. Insert 28 is preferably made of high density polyethylene having the properties of moderate stiffness (permitting flexibility of insert 28) and resiliency. Insert 28 acts as a skeleton for tire 12, being stiff enough to permit tire 12 to carry substantial loads without fully collapsing. However, insert 28 is also flexible and resilient enough to permit tire 12 to deform under load and to retain its original shape when the load is removed. Having such properties, tire 12 provides substantial ride cushioning without the need for pressurizing hollow internal area 29 of insert 28. Therefore, tire 12 is non-deflatable upon puncture of insert 28.

The particular type of insert material used (and the particular properties of the material used) will largely determine the reaction of insert 28 to loading and impact. Therefore, the material and properties of insert 28 may be selected according to the anticipated uses and use conditions of tire 12. For example, if the tire is expected to be constantly used in a warm or hot environment, another plastic (such as ABS), might be selected instead of high density polyethylene. Though insert 28 is preferably made of high density polyethylene, a number of other materials may also be used, such as vinyls, rubbers, plastics, polycarbonate, ABS, or composites.

Insert 28 may be made by a number of processes, such as by conventional injection molding, blow molding, or vacuum forming. Insert 28 may be made from two or more pieces, or may be formed in one piece as illustrated in the Figures (such as when made by a blow molding process). When two or more pieces are used to make insert 28, the individual pieces can be joined in a number of ways, such as by welding the pieces together with molten plastic or by spin welding, where one part is spun at high speed against another part until the heat generated from friction "welds" the two parts together.

The shape and size of the cross section of insert 28 shown in FIG. 5 will also determine the flexibility of tire 12. The particular cross-sectional shape shown in FIG. 5 is a curved trapezoid. However, the cross-sectional shape of insert 28 may instead be oval, circular, or another shape, and may be smaller or larger than the shape shown in FIG. 5. Hollow internal area 29 within insert 28 not only makes tire 12 lighter (as opposed to a solid tire design), but it also reduces the cost of material which otherwise would be used to fill hollow internal area 29.

Figure 6:
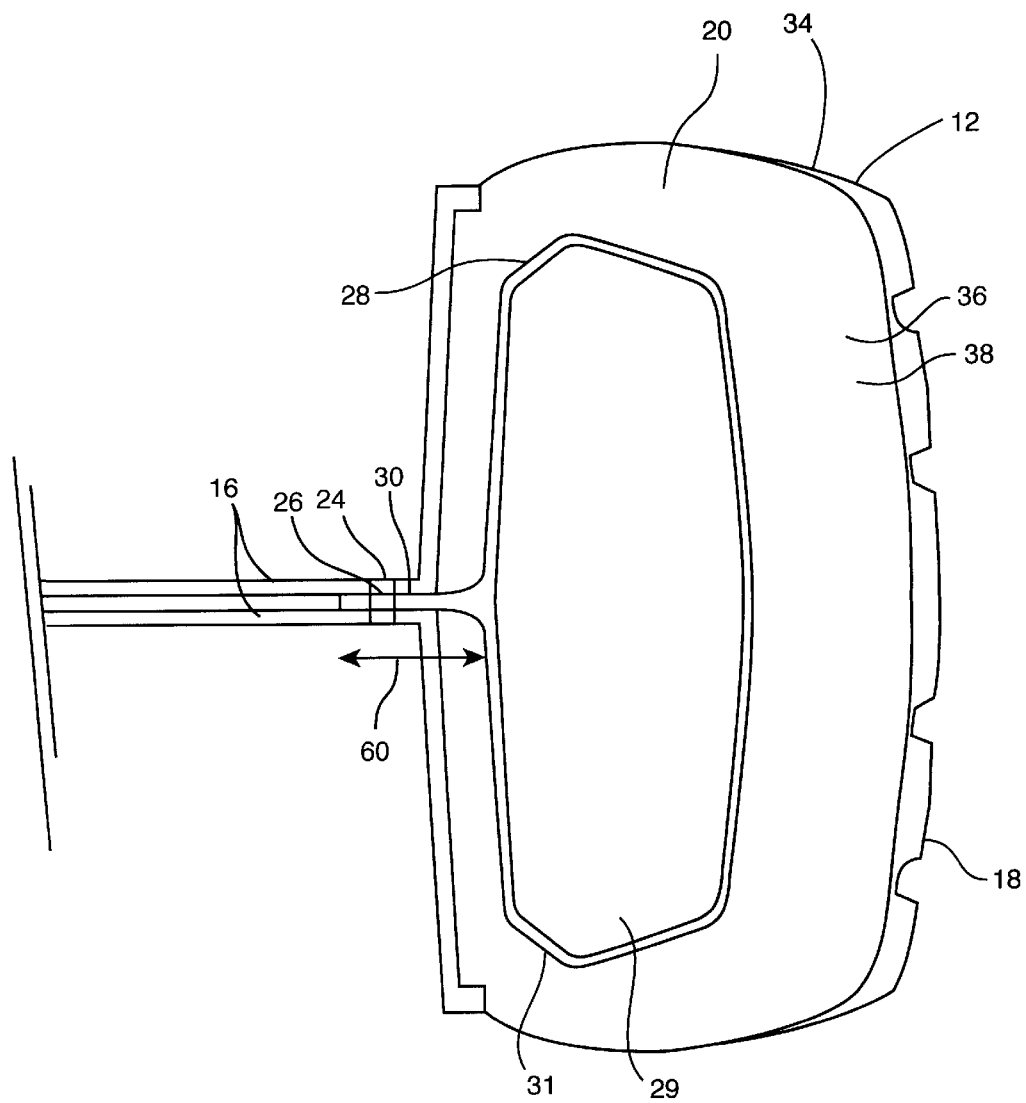
FIG. 6 is a close-up view of a portion of the wheel assembly shown in FIG. 5.

With reference to FIGS. 5 and 6, insert 28 is surrounded by a flexible polyurethane material which makes up a core or body 38 of tire 12. Body 38 of tire 12 includes sidewalls 20. The polyurethane material is preferably a flexible foam matrix of a combination of polyol and poly-isocyanate. The polyol component of the foam matrix typically consists of a blend of polyols, chain extenders, surfactants to control cell structure and material flow in the mold, catalysts to control chemical reaction speed, and pigments for color. However, a number of other materials besides polyurethane (such as rubber) may also be used.

For visual effect or as a safety feature, dyes or pigments (florescent or otherwise) may be added to the polyethylene material of insert 28 and/or to the polyurethane material used to make up tire 12.

In a preferred method of making tire 12, a spray coating of polyurethane elastomer is sprayed into a hot mold, curing the sprayed polyurethane elastomer to form a tough outer layer or "skin" 34 of tire 12. Outer layer 34 comprises tread 18 and at least part of the surface of sidewalls 20 of tire 12. Controlling the thickness of outer layer 34 is difficult with the mold in a static position. However, the thickness of outer layer 34 may be better controlled by spinning the mold at a constant speed, controlling the throughput of the polyurethane material being sprayed, and controlling the spray pattern and the duration of the spray application. The polyurethane elastomer sprayed to make outer layer 34 is preferably sprayed in a thick pattern in the tread area 18 and in a thinner pattern (0.010 in. to 0.060 in.) completely around the side wall and inner diameter portion of the mold, resulting in a continuous skin on the finished tire 12 which protects sidewalls 20 from damage in use. In addition, the continuous polyurethane skin provides a moisture barrier for tire 12, preventing water and other fluids from penetrating the foam body 38 of tire 12. The sidewall skin also provides an effective and attractive surface for a "molded in" tire name and other nomenclature, and provides a non-porous surface for subsequent stenciling, if desired. Curing of the sprayed polyurethane may be controlled by a catalyst added to the polyol component of the polyurethane used to make the outer layer 34. Other methods for making outer layer 34 are possible, such as a combination of centrifugal casting and rotational casting, or by inserting into the mold a tread and sidewall either totally or partially formed by injection or RIM molding.

Next, insert 28 is secured within the mold. To insure a secure bond between insert 28 and polyurethane foam which will be formed around insert 28, the surface 31 of insert 28 may be treated. Methods of treating surface 31 include flame treating, surface roughening, application of adhesives, corona discharge treating, or a combination of such methods.

Finally, polyurethane foam is injected within the mold, and expands to fill inner area 36 of tire 12 between insert 28 and the internal surface of the mold and/or outer layer 34. The polyurethane elastomer of outer layer 34 is preferably of a combination of polyol and polyisocyanate, but is a different formulation than that used for the polyurethane foam comprising body 38 within inner area 36. While remaining flexible, the polyurethane material of outer layer 34 is tougher, more dense, and more abrasive resistant than the polyurethane foam within inner area 36. These properties of outer layer 34 are desirable for at least a portion of sidewalls 20 and all of tread 18 of tire 12. However, the less-dense foam polyurethane within inner area 36 provides the desirable flexibility of tire 12, while keeping the weight of tire 12 low. The reaction rate and cure of the polyurethane used to make up outer layer 34 and the polyurethane within inner area 36 can be influenced by controlling the temperature of the mold and the temperature of the polyurethane components in the spray equipment. Higher heat causes faster reaction and thus, faster cure.

Preferably, the polyurethane of outer layer 34 and within inner area 36 has an isocyanate component which is a Modified Diphenylmethane Diisocyanate. The polyol components consist of high molecular weight polyether polyols. In the outer layer 34 material, the polyols are blended with catalysts, flow control agents, surfactants, molecular sieves and pigment. In the material within inner area 36, the polyols are blended with surfactants, catalysts, pigments, and water as the blowing agent. Other blowing agents may be successfully used, such as pentane (which is explosive and requires spark-proof equipment and efficient ventilation).

The formulation and density of the polyurethane 34 and 38 (within inner area 36) substantially affects the stiffness and cushioning characteristics of tire 12. The denser the polyurethane 34,38, the harder the ride produced by tire 12. Similarly, the harder the formulation the harder the ride. The ride can be softened by lowering the density of the foam, softening the foam formulation, or doing a combination of both. The formulation of the polyurethane coating and foam can be adjusted to provide a range of different properties, including load bearing ability, firmness, resiliency, resistance to compression set, tensile strength, tear strength, etc.

The polyurethane foam within inner area 36 must have the capability of transferring torque from the insert to the urethane tread (outer layer 34). This foam must also be able to take the dynamic and static compressive loads from the attached vehicle (with rider) and rebound to take its original shape. A preferred embodiment of foam within inner area 36 is molded in the 0.30 to 0.35 g/cc density range, exhibits a hardness of 45–50 Shore A, and has a core tensile strength of 260–320 psi at 210–240% elongation. Core Die C tear strength of the preferred embodiment foam within inner area 36 is 40–50 lbs/linear inch. The foam has a ball rebound of 45–50%, a compression set of 10–20%, a compression force deflection of 82 lbs at 25% deflection and 150 lbs at 50% deflection.

The polyurethane elastomer making up outer layer 34 should be as strong or stronger than tread rubber currently commonly used. Tread rubber typically has a tensile strength of 2200 psi, tensile elongation of 390%, die C tear of 340 lbs/linear inch, taber abrasion of 434 mg loss per 1000 cycles on a Taber abrader, and a Shore A hardness of 65–70. The polyurethane can be formulated to match or exceed the physical properties of rubber, and has enhanced abrasion resistance.

Preferred production parameters of tire 12 are as follows. With regard to the polyurethane material filling inner area 36 of tire 12, the polyurethane foam components are temperature controlled at 90–110° F. Metal production molds are temperature controlled at 105–120° F. The polyurethane material is dispensed into the molds from a high pressure impingement mixing polyurethane processor (RIM processor). The amount of foam dispensed into the molds is controlled by a timed dispense shot correlated to the throughput of the components flowing through the mix head. The molds are spun at between 180 and 350 RPM depending upon the tire diameter (larger diameters requiring lower speeds and smaller diameters requiring higher speeds). Dwell time in the mold to attain handling strength for demolding varies from 2–5 minutes. Tires are cured for 7 days at 70° F. or postcured for shorter periods of time at higher temperatures prior to service.

With regard to the polyurethane elastomer material making up outer layer 34, the material is temperature controlled at 160–185° F. and is dispensed from a high pressure impingement mixing spray gun. The mold surface temperature is controlled at 105–120° F. The thickness of outer layer 34 is controlled by the spray pattern, throughput of material through the mix head, rotational speed of the mold, and the duration of the spray application. The thickness of outer layer 34 is determined by what is required to provide the wear characteristics necessary for the intended service conditions of tire 12.

The polyurethane spray coating and injection processes described above are preferably performed while the mold is spinning, thereby ensuring proper distribution of the polyurethane within the mold. Such a method of molding also results in a tire which is automatically balanced.

Preferably, the dyes or pigments used to color the tire as described above are added to the polyurethane coating making up the tread and a portion of the sidewall (outer layer 34), since these are the tire components visible to the user.

Figure 7:
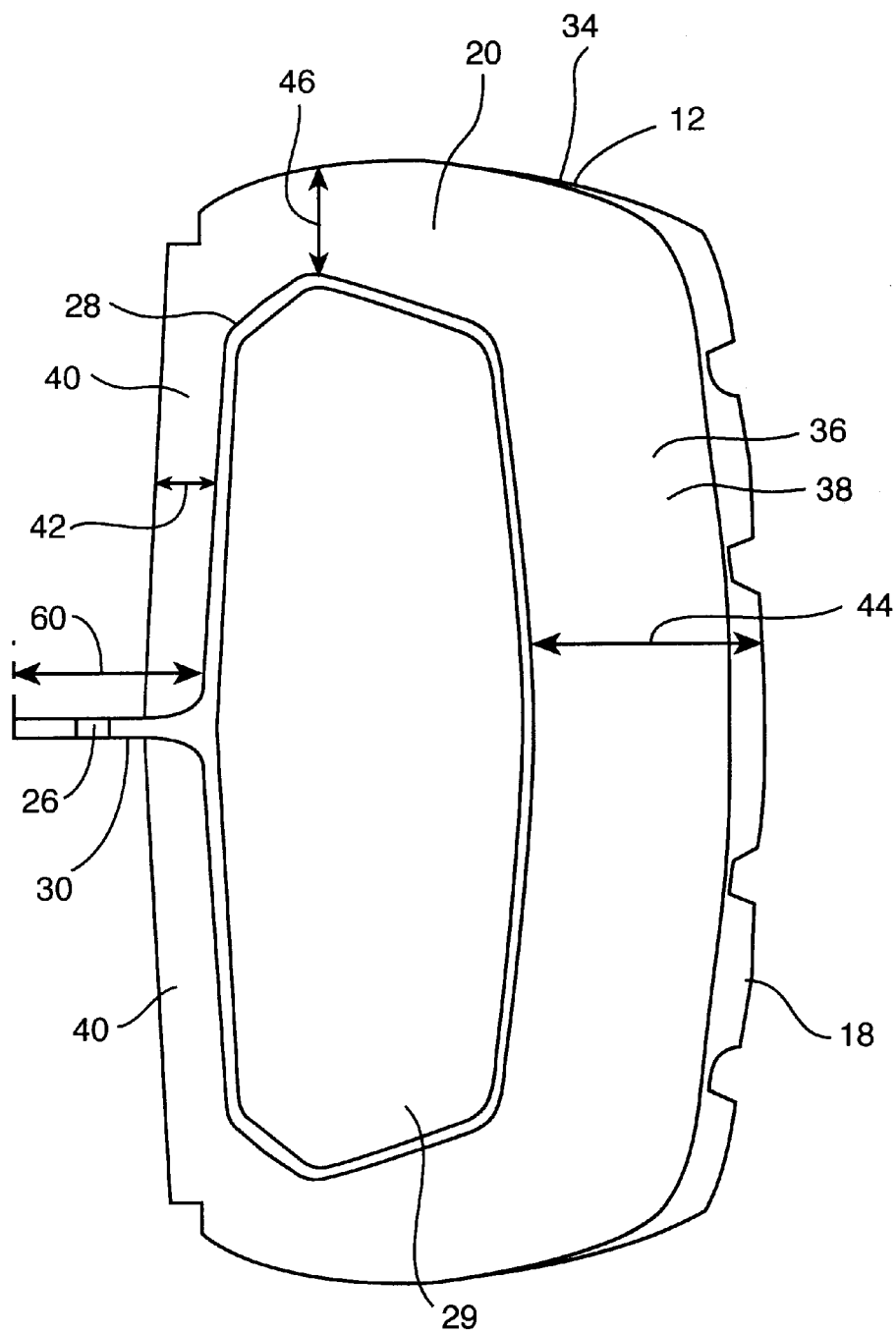
FIG. 7 is the close-up view of FIG. 6, showing just the tire and tire insert of the present invention.
Figure 8:
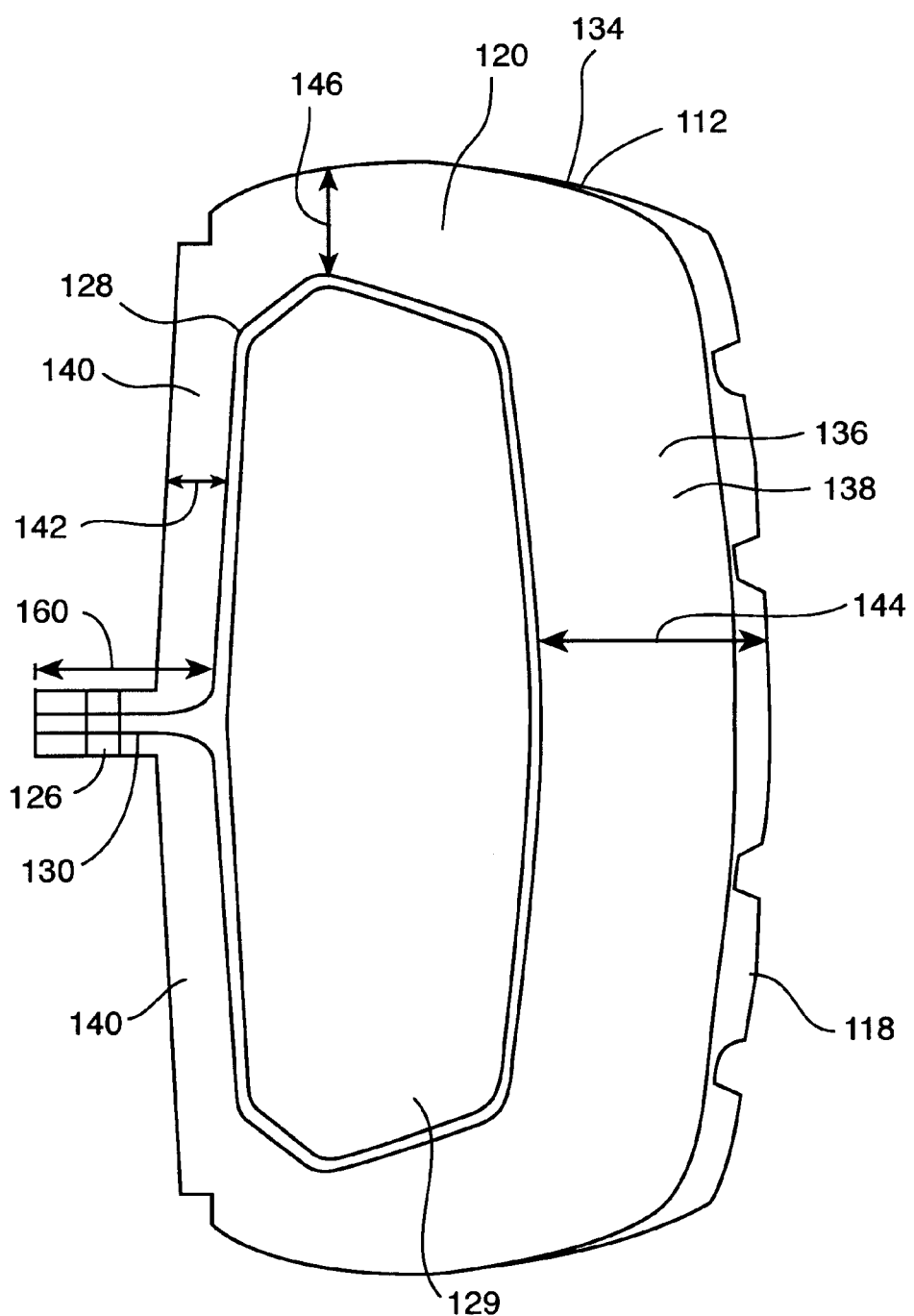
FIG. 8 is another embodiment of the tire and tire insert shown in FIG. 7.

With reference to FIGS. 7 and 8, it should be noted that the relative position of insert 28,128 with respect to surrounding polyurethane foam 38,138 may vary. For instance, in FIG. 7, interior polyurethane sections 40 cover only a small portion of flange 30. However, in FIG. 8, all of flange 130 is covered by interior polyurethane sections 140. The dimensions 42,142, 44,144, and 46,146 of inner area 36,136 may also vary with respect to one another (e.g., dimension 42,142—the thickness of section 40,140—may be as thick as dimension 44,144 or may be extremely thin). The exact size of dimensions 42,142, 44,144, and 46,146 will depend upon the desired flexibility, spring rate, and cushion provided by tire 12,112. Another important dimension of tire 12 is shown in FIG. 5. As can be seen from FIG. 5, diameter 48 of inner surface 50 of tire 12 varies along imaginary axis A of tire 12. Diameter 48 is preferably sized to create a light interference fit between rims 16 and tire 12 when tire 12 is mounted on rims 16. When tire 12 is in use, a significant amount of torque or braking load is supplied to tire 12 through rims 16, bolts 14, flange 30, and insert 28. However, with an appropriate interference fit between tire 12 and rims 16, torque and braking loads are also transmitted from rims 16 directly to tire 12 by the tire's inner surface 50.

Figure 9:
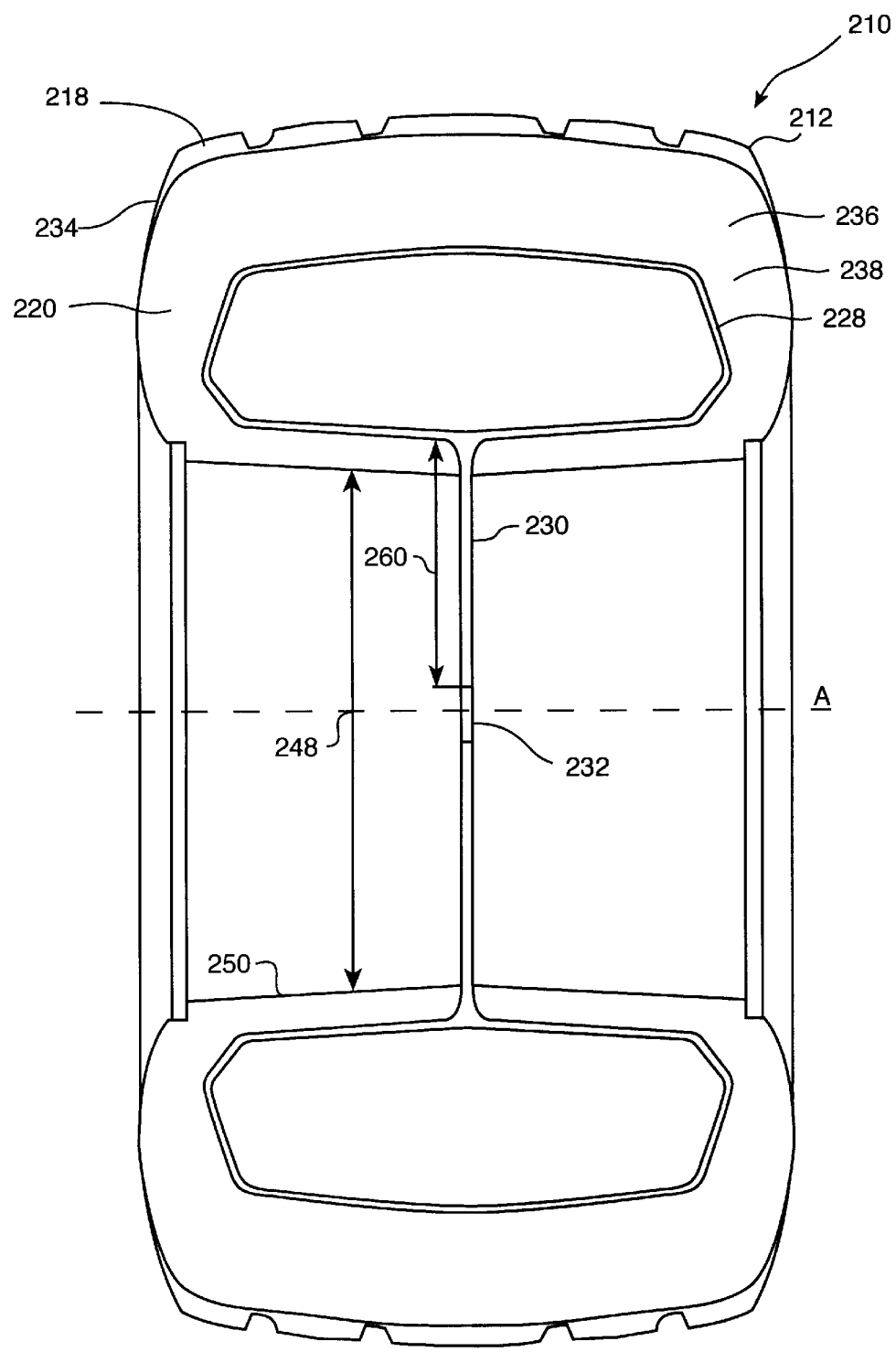
FIG. 9 is another embodiment of the wheel assembly shown in FIG. 5.

Length 60,160 of flange 30,130 may be relatively short, as shown in FIGS. 5–8, or may instead extend all the way to the central axle hole 232 (or imaginary axis A of tire 210 if the axle to which tire 210 is attached does not require an axle hole), as shown in FIG. 9. In the embodiment shown in FIG. 9 (intended for light loading conditions), extended flange 230 actually takes the place of rims 16 (see FIG. 5), permitting tire 212 to be mountable directly onto an axle.

Figure 10A:
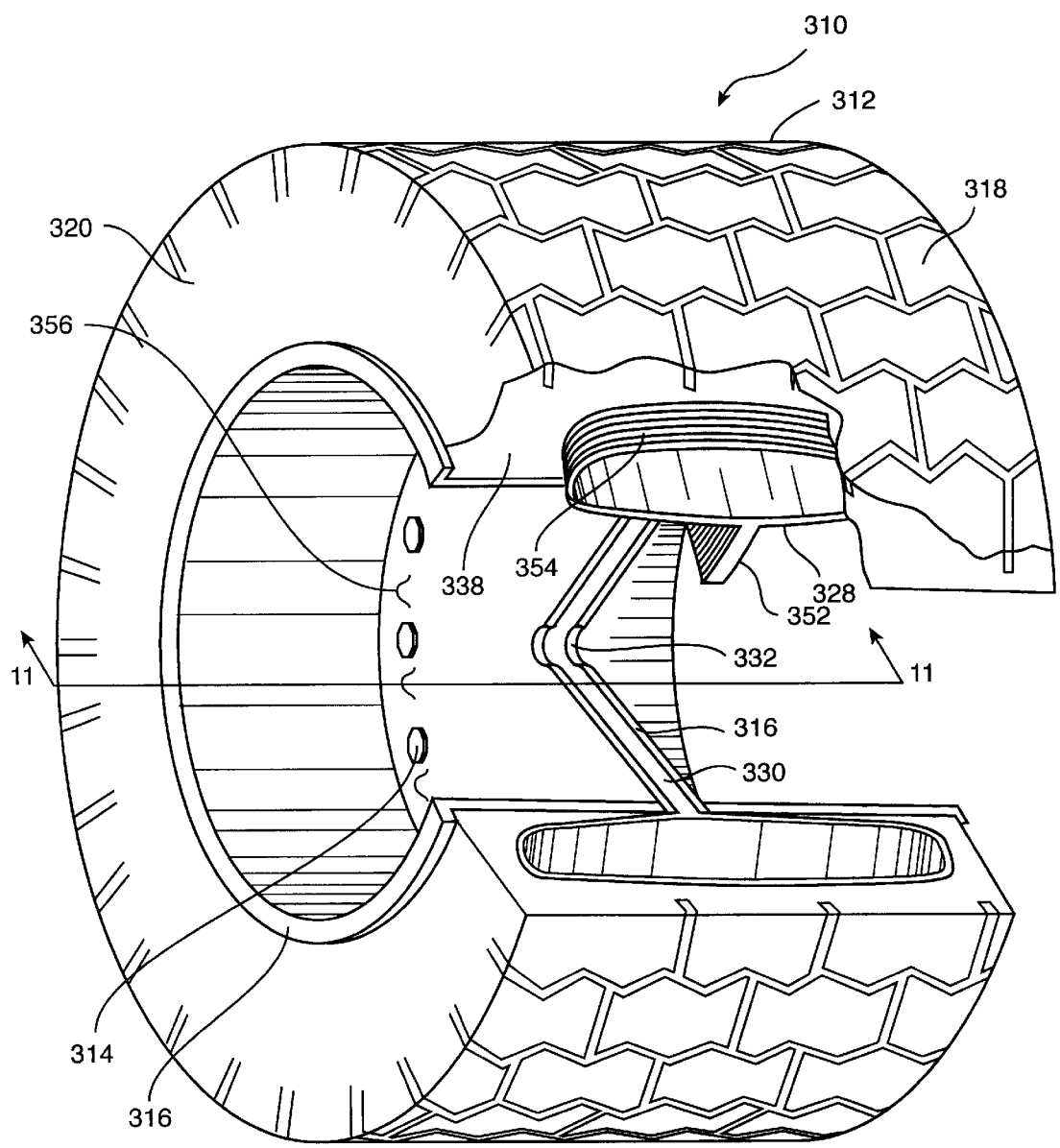
FIG. 10a is a sectioned, perspective view of another embodiment of the present invention.
Figure 10B:
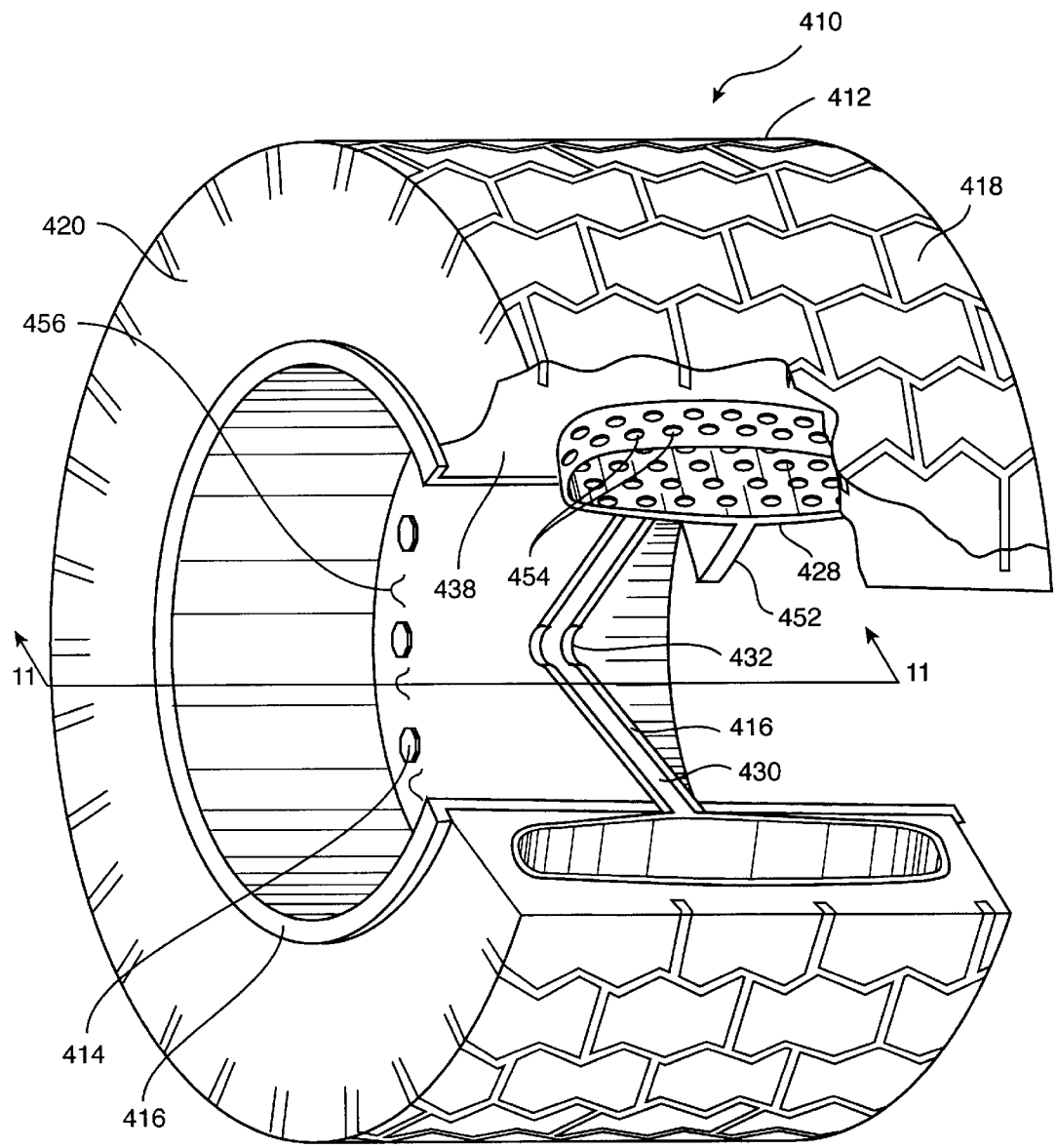
FIG. 10b is a sectioned, perspective view of yet another embodiment of the present invention.

FIG. 10a shows a cross section of another embodiment of the invention, wheel assembly 310. When torque is transmitted to insert 328 (from rims 316 through bolts 314, and flange 330), insert 328 transmits torque to polyurethane matrix 338. In addition to surface treatment of insert 328 (discussed above), to ensure minimal to zero slippage between insert 328 and polyurethane matrix 338, outer surface 352 of insert 328 is ribbed. The ribs 354 on insert 328 present a larger amount of surface area to polyurethane matrix 338 than when outer surface 352 is smooth. This, plus the fact that matrix 338 can seep between ribs 354, permits insert 328 to transmit a higher torque to matrix 338 without slippage. In addition to or instead of employing ribs 354 on insert 328, outer surface 352 of insert 328 may be covered with dimples, holes, ridges, etc. By way of illustration, FIG. 10b is a cross section of another embodiment of wheel assembly 410, which is the same as wheel assembly 310 shown in FIG. 10a, but which utilizes small holes 454 formed through the surface of insert 428 instead of using ribs 354 as shown in FIG. 10a. Holes 454 are large enough to permit polyurethane matrix 438 to enter into holes 454, but are small enough to prevent a large amount of polyurethane matrix 438 to flow inside of insert 428.

Figure 11A:
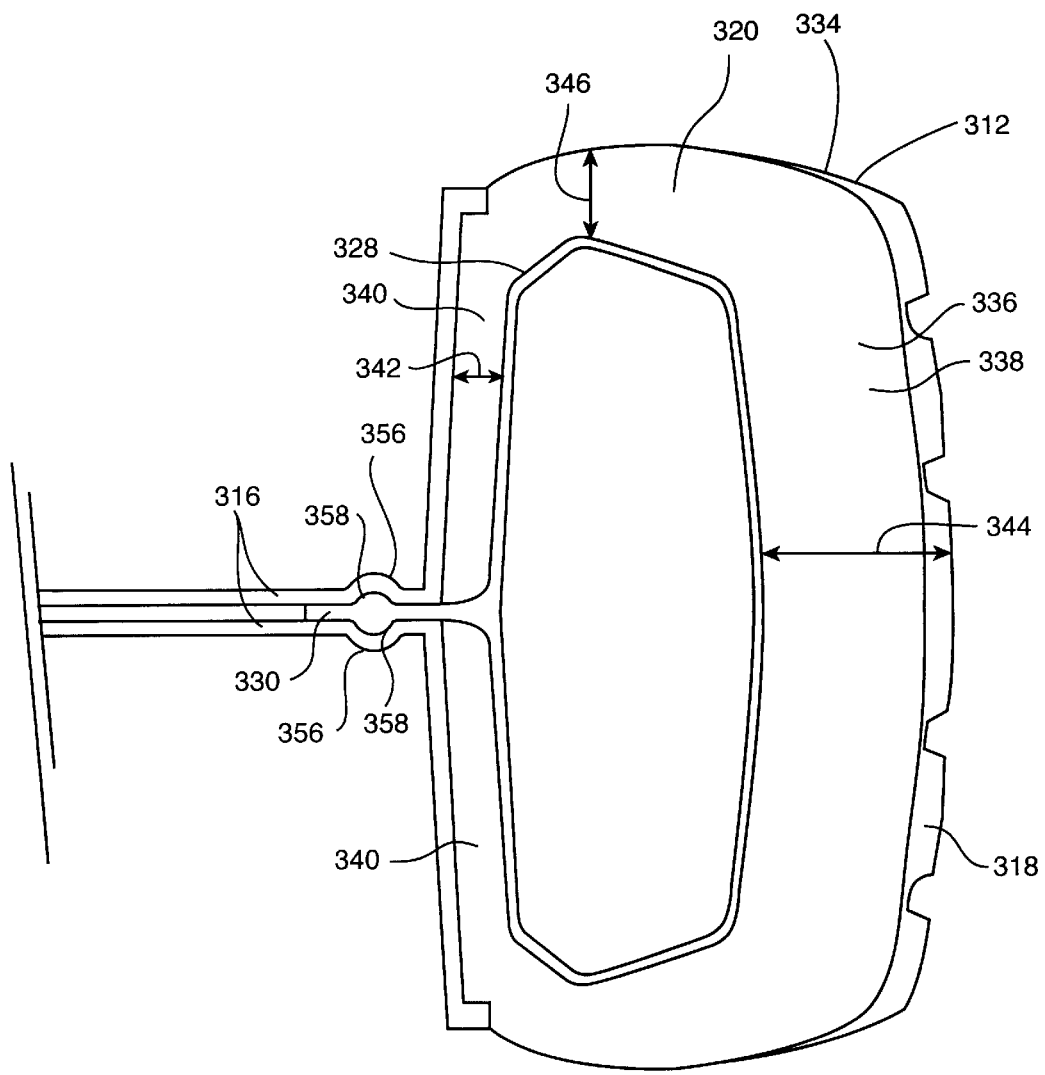
Figure 12:
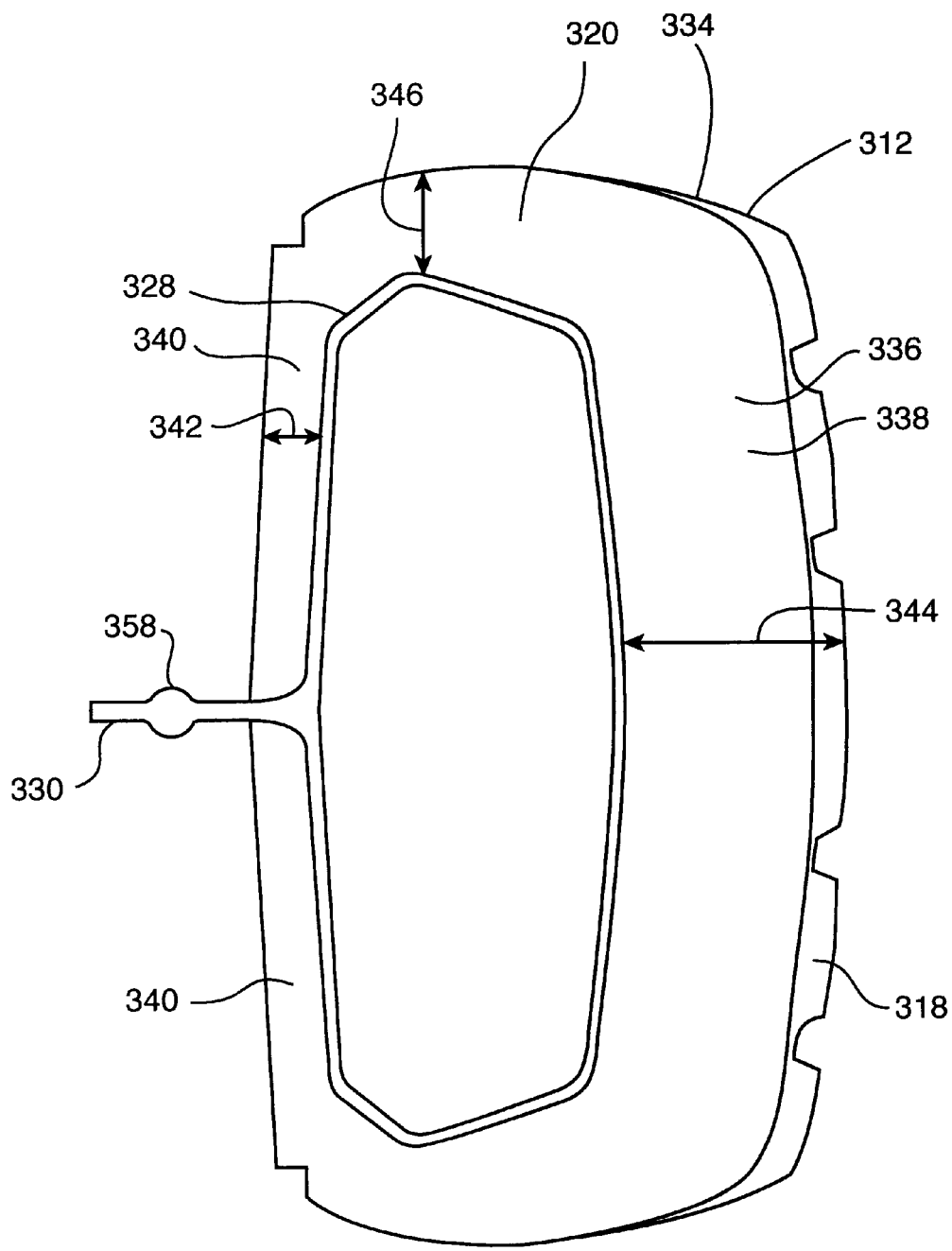
FIG. 12 is the cross-sectional view of FIG. 11a, showing just the tire and tire insert.

Also shown in the embodiment in FIGS. 10a and 10b are protuberances 356,456 on rims 316,416. As can be seen in FIGS. 11a and 12 (cross sectional views of the wheel assembly shown in FIG. 10a taken along lines 11—11 in FIG. 10a), protuberances 356 are formed in rims 316, and receive corresponding protuberances 358 formed in flange 330 of insert 328. Protuberances 356,358 act to help transmit torque from rims 316 to flange 330 of insert 328, thereby helping to relieve the torque and braking loads experienced by bolts 314, rim holes 24, and flange holes 26. This permits the use of fewer bolts 314 to secure rims 316 to flange 330 of insert 328. Protuberances 356,358 may also be used to assist in locating the proper alignment of rims 316 with tire 312 during the assembly process.

Figure 11B:
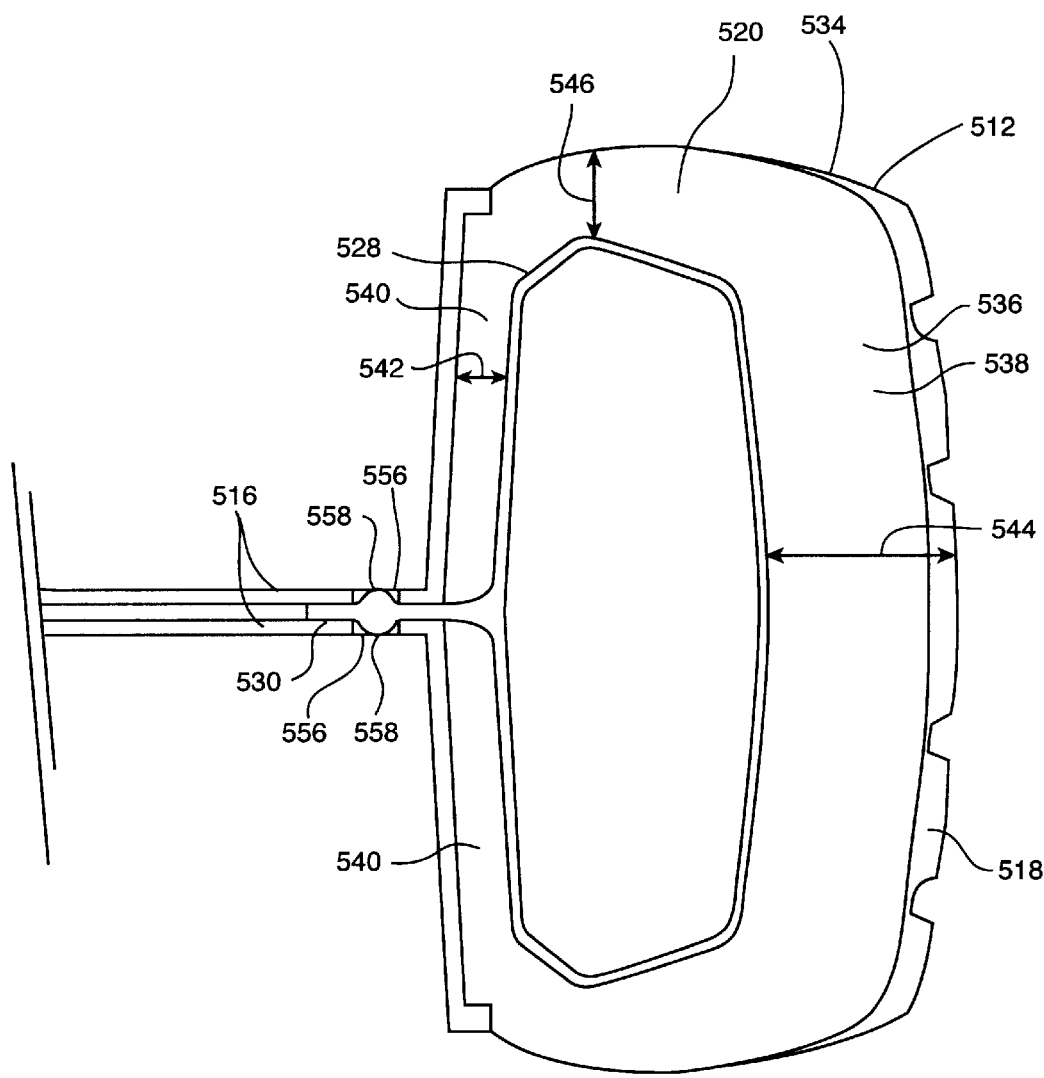

An alternative protuberance arrangement is shown in the embodiment of the present invention shown in FIG. 11b. In this alternative protuberance arrangement, protuberances 558 in insert flange 530 mate with holes 556 in rims 516 (rather than mating with matching rim protuberances as shown in FIG. 11a).

Figure 11C:
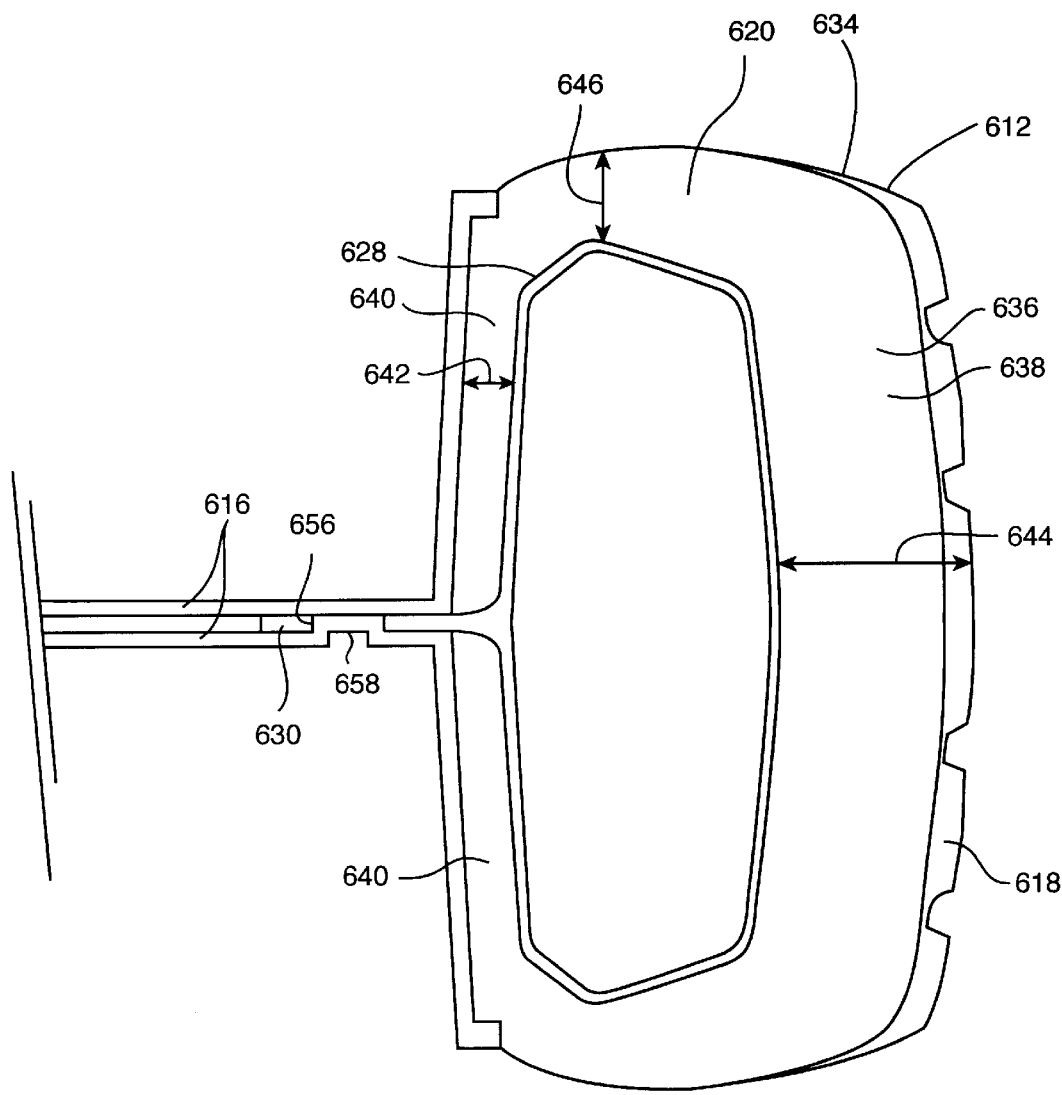

Another alternative protuberance arrangement is shown in the embodiment of the present invention shown in FIG. 11c. In this alternative protuberance arrangement, holes 656 formed in insert flange 630 mate with protuberances 658 formed in rims 616. Only one protuberance can be seen in one of rims 616 in FIG. 11c. However, it will be appreciated that protuberances 658 can be formed in both rims 616, such that protuberances formed in one rim 616 alternate with protuberances formed in the second rim 616 along the circumference of rims 616. As such, alternating protuberances in both rims 616 mate with holes 656 in insert flange 630 to transmit torque between rims 616 and insert 628 and to help align rims 616 and insert flange 630 during the assembly process.

Figure 13:
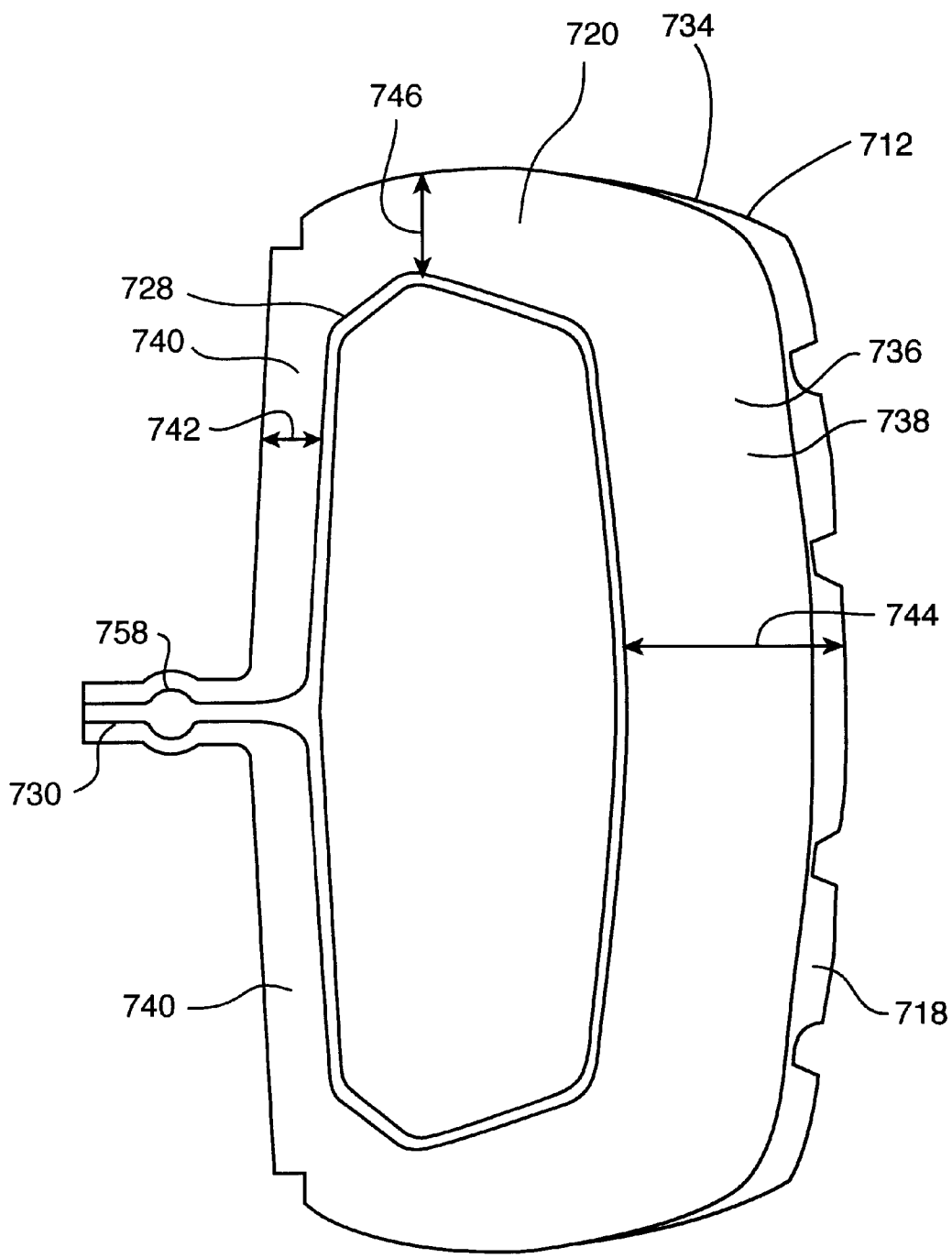
FIG. 13 is another embodiment of the tire and tire insert shown in FIG. 12.

Referring now to FIGS. 12 and 13, as with the embodiments shown in FIGS. 7 and 8, flange 330,630 may be bare of any polyurethane covering (FIG. 12), or may instead be covered by interior polyurethane section 740 (FIG. 13).

Figure 14:
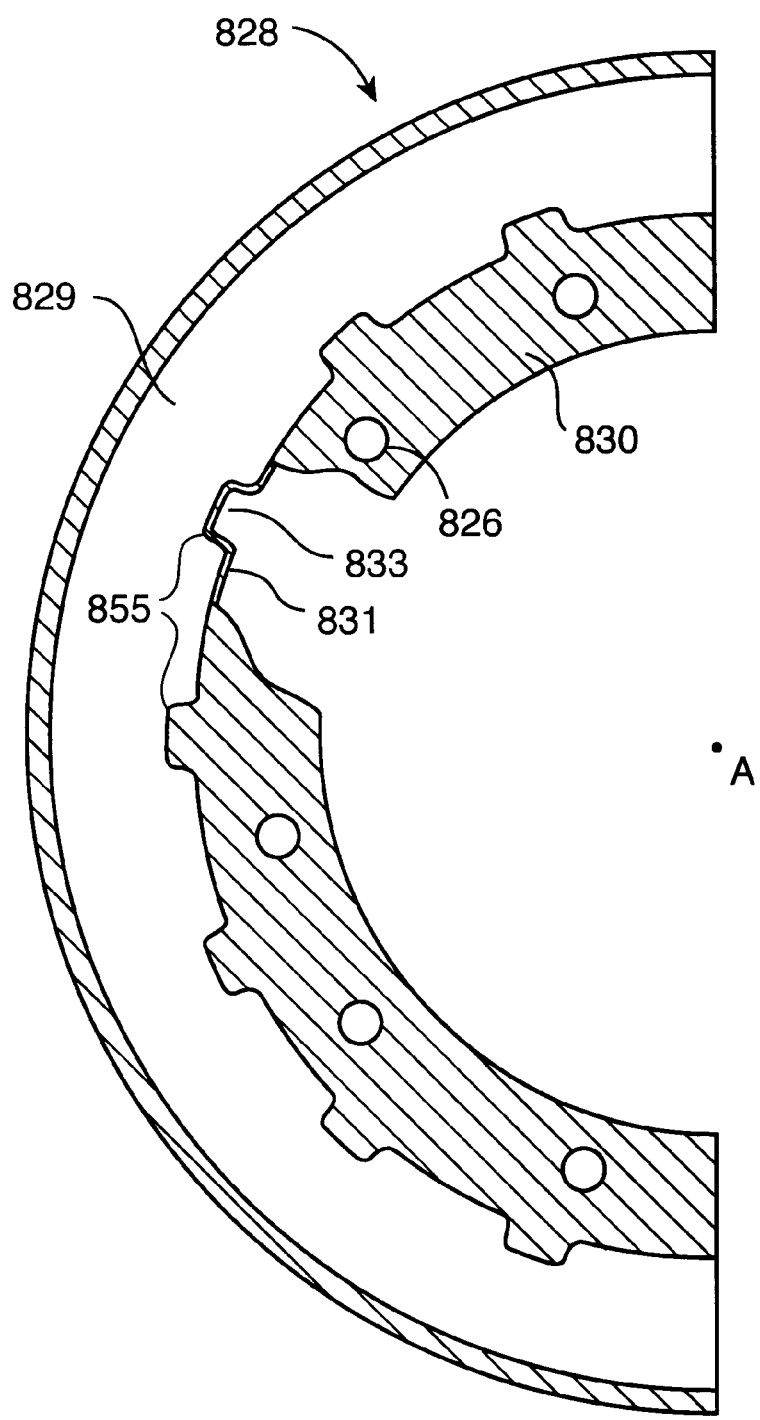
FIG. 14 is a cross-sectional view of another embodiment of the wheel assembly shown in FIG. 5, taken along section lines 14—14 of FIG. 5, and showing only the tire insert.

FIG. 14 is a cross-sectional view of yet another embodiment of the wheel assembly shown in FIG. 5, taken along section lines 14—14 of FIG. 5, and showing only tire insert 828. In FIG. 14, tire insert 828 has large ribs 855 on insert wall 831 closest to the center of imaginary axis A of the insert. With flange 830 removed in the cutaway section of FIG. 14, it can be seen that each rib 855 defines an interior space 833. When polyurethane is formed around insert 828, polyurethane flows into spaces 833 in ribs 855. The ribbed surface of insert wall 831 creates an interface with the surrounding polyurethane which is able to transmit larger torque loads than a insert wall 831 without ribs 855.

It will be appreciated that various changes in the details, materials and arrangement of parts which have been herein described and illustrated in order to explain the nature of the present invention may be made by those skilled in the art within the principle and scope of the invention as expressed in the following claims. For example, the embodiments described and illustrated all employ bolts and nuts to fasten rims 16 together and to flange 30 of insert 28. A number of other fastening techniques, such as screws or riveting, will achieve the same result and will be readily apparent to one skilled in the art.

What is claimed is:

1. A method of making a tire assembly, the method comprising the steps of:
   (a) providing a toroid-shaped hollow insert, the insert having a flange portion, said flange portion having a first end and a second end, said first end of said flange portion being integral with said hollow insert, and said second end of said flange portion extending toward an imaginary central axis circumscribed by the insert; and
   (b) molding a foam body around the insert to form a tire, so that said insert and said first end of said flange portion are completely surrounded by said foam body and said second end of said flange portion is allowed to remain uncovered by said foam body.

2. A method of making a tire assembly as claimed in claim 1, further comprising the step of forming at least one flange hole within the flange.

3. A tire assembly as claimed in claim 1, wherein the tire has an exterior skin made of a polyurethane elastomer.

4. A method of making a tire assembly as claimed in claim 1, wherein before the body is formed around the insert, a layer of material is molded around the insert to define a tough and abrasive-resistant skin of the tire, the layer of material defining a cavity between the layer of material and the insert, the cavity then being filled to form the body around the insert.

5. A method of making a tire assembly as claimed in claim 4, wherein the layer of material is made of a polyurethane elastomer.

6. A method of making a tire assembly as claimed in claim 4, wherein the layer of material has tire treads formed therein, and wherein the layer of material substantially covers the sidewalls of the tire.

7. A method of making a tire assembly as claimed in claim 1, wherein the tire has an exterior wall with tire treads formed therein.

8. A method of making a tire assembly as claimed in claim 1, wherein the insert has an oval cross sectional shape.

9. A method of making a tire assembly as claimed in claim 1, wherein the insert has an exterior surface, the exterior surface being ribbed.

10. A method of making a tire assembly as claimed in claim 1, wherein the insert has at least one rib formed therein to define a void into which the foam body molded around the insert extends.

11. A method of making a tire assembly, the method comprising the steps of:
   (a) providing a toroid-shaped hollow insert, the insert having a flange portion, said flange portion having a first end and a second end, said first end of said flange portion being integral with said hollow insert, and said second end of said flange portion extending toward an imaginary central axis circumscribed by the insert;
   (b) molding a foam body around the insert to form a tire, so that said insert and said first end of said flange portion are completely surrounded by said foam body and said second end of said flange portion is allowed to remain uncovered by said foam body; and
   (c) forming at least one protuberance within said flange portion.

12. A method of making a tire assembly, the method comprising the steps of:
   (a) providing a toroid-shaped hollow insert, the insert having a flange portion, said flange portion having a first end and a second end, said first end of said flange portion being integral with said hollow insert, and said second end of said flange portion extending toward an imaginary central axis circumscribed by the insert; and
   (b) molding a foam body around the insert to form a non-deflatable tire,
said insert and said first end of said flange portion being completely surrounded by said foam body and said second end of said flange protruding from said foam body.

13. The method of making a tire assembly as claimed in claim 12, wherein said insert is made of polyethylene.

14. A method of making a tire assembly, the method comprising the steps of:
   (a) providing a toroid-shaped hollow insert, the insert having a flange portion, said flange portion having a first end and a second end, said first end of said flange portion being integral with said hollow insert, and said second end of said flange portion extending toward an imaginary central axis circumscribed by the insert; and
   (b) molding a foam body around the insert to form a tire, so that said insert and said first end of said flange portion are completely surrounded by said foam body and said second end of said flange portion is uncovered by said foam body.

15. The method of making a tire assembly as claimed in claim 14, wherein said foam body is made of polyurethane foam.

16. The method of making a tire assembly as claimed in claim 1, wherein said hollow insert is made of a single piece or of two piece material.

* * * * *